United States Patent
Lin et al.

(10) Patent No.: US 7,911,463 B2
(45) Date of Patent: Mar. 22, 2011

(54) POWER SUPPLY TOPOLOGIES FOR INVERTER OPERATIONS AND POWER FACTOR CORRECTION OPERATIONS

(75) Inventors: Yung-Lin Lin, Palo Alto, CA (US); Da Liu, Milpitas, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 1129 days.

(21) Appl. No.: 11/216,912

(22) Filed: Aug. 31, 2005

(65) Prior Publication Data

US 2007/0047276 A1 Mar. 1, 2007

(51) Int. Cl.
*G09G 5/00* (2006.01)

(52) U.S. Cl. ........................................................ 345/212

(58) Field of Classification Search .................. 315/119, 315/224, 307, 24, 132, 40; 363/17, 98; 345/211–213
See application file for complete search history.

(56) References Cited

U.S. PATENT DOCUMENTS

| | | | | |
|---|---|---|---|---|
| 5,510,974 | A * | 4/1996 | Gu et al. | 363/134 |
| 5,598,326 | A * | 1/1997 | Liu et al. | 363/34 |
| 6,272,023 | B1 * | 8/2001 | Wittenbreder | 363/16 |
| 6,272,027 | B1 * | 8/2001 | Fraidlin et al. | 363/26 |
| 6,370,039 | B1 * | 4/2002 | Telefus | 363/15 |
| 7,378,801 | B2 * | 5/2008 | Jeon | 315/209 R |

OTHER PUBLICATIONS

Grigore, et al., "High Power Factor Rectifier Based on Buck Converter Operating in Discontinuous Capacitor Voltage Mode," IEEE Transactions on Power Electronics, vol. 15, No. 6, Nov. 2000, pp. 1241-1249.

Morrison, et al., "A New Modulation Strategy for a Buck-Boost Input AC/DC Converter," IEEE Transactions on Power Electronics, vol. 16, No. 1, Jan. 2001, pp. 34-45.

Gotfryd, "Limits in Boost Power Factor Corrector Operating in Border-Line Mode," IEEE Transactions on Power Electronics, vol. 18, No. 6, Nov. 2003, pp. 1330-1335.

Chen, et al., "Analysis and Design of a Low-Stress Buck-Boost Converter in Universal-Input PFC Applications," IEEE Transactions on Power Electronics, vol. 21, No. 2, Mar. 2006, pp. 320-329.

Morais, et al., "A High Power Factor Ballast Using a Single Switch With Both Power Stages Integrated," IEEE Transactions on Power Electronics, vol. 21, No. 2, Mar. 2006, pp. 524-531.

Galleja, "Design and Experimental Results of an Input-Current-Shaper Based Electronic Ballast," IEEE Transactions on Power Electronics, vol. 18, No. 2, Mar. 2003, pp. 547-557.

Martin, et al., "Analysis and Design of a High Power Factor, Single-Stage Electronic Ballast for High-Intensity Discharge Lamps," IEEE Transactions on Power Electronics, vol. 18, No. 2, Mar. 2003, pp. 528-569.

Arun, et al., "Improved Active Power-Factor-Correction Circuit Using a Zero-Voltage-Switching Boost Converter," IEEE Transactions on Power Electronics, vol. 13, No. 2, Mar. 1998, pp. 308-315.

* cited by examiner

*Primary Examiner* — Chanh Nguyen
*Assistant Examiner* — Tsegaye Seyoum
(74) *Attorney, Agent, or Firm* — Grossman, Tucker, Perreault & Pfleger, PLLC

(57) ABSTRACT

A method according to one embodiment may include generating, by a controller, a plurality of control signals to control operations of inverter circuitry to generate an AC signal from a DC signal. The method of this embodiment may also include using the control signals generated by the controller to also control operations of power factor correction (PFC) circuitry, via the inverter circuitry, to enable the PFC circuitry to generate power factor correction of an input source coupled to the PFC circuitry and the inverter circuitry. Of course, many alternatives, variations, and modifications are possible without departing from this embodiment.

12 Claims, 14 Drawing Sheets

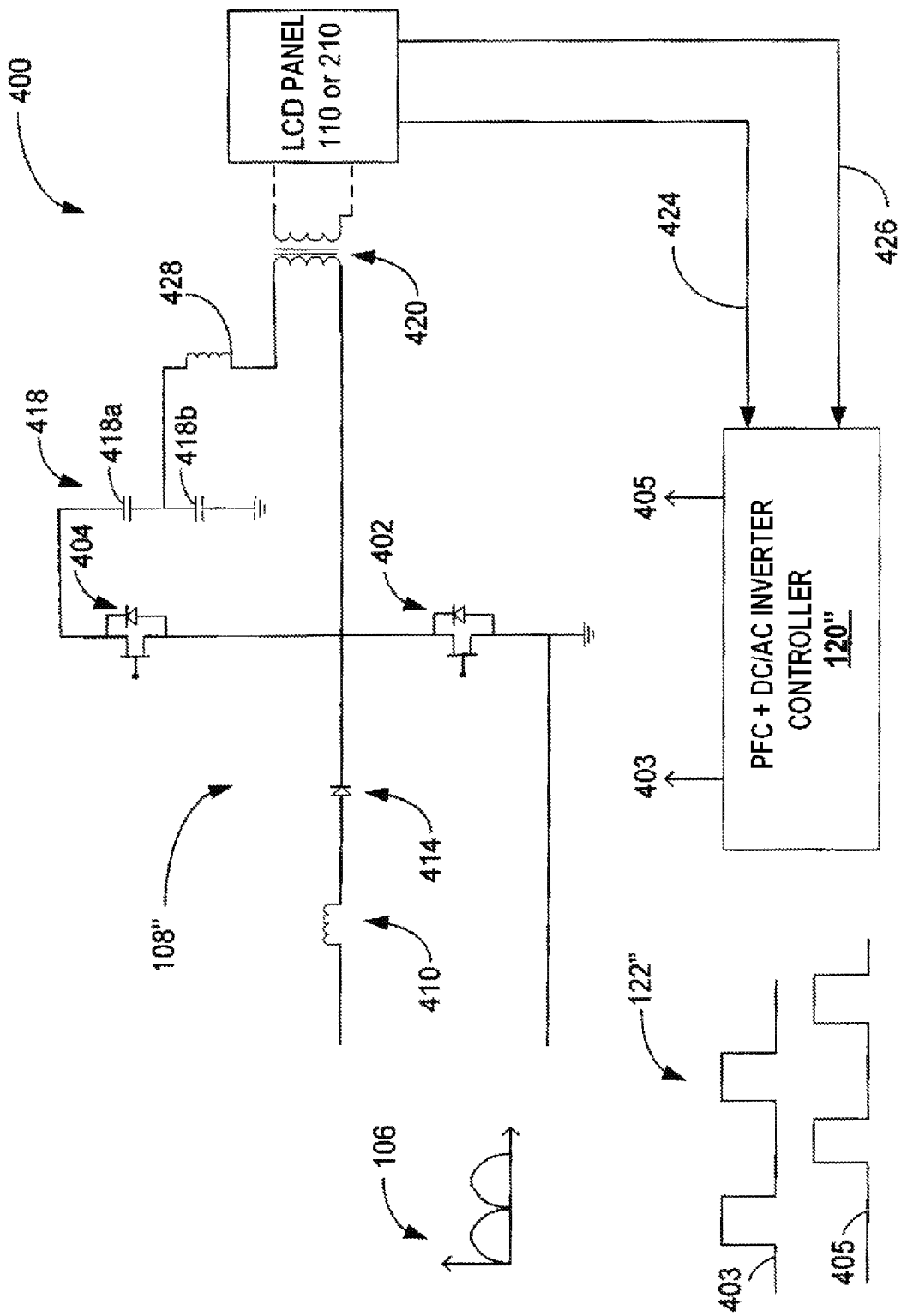

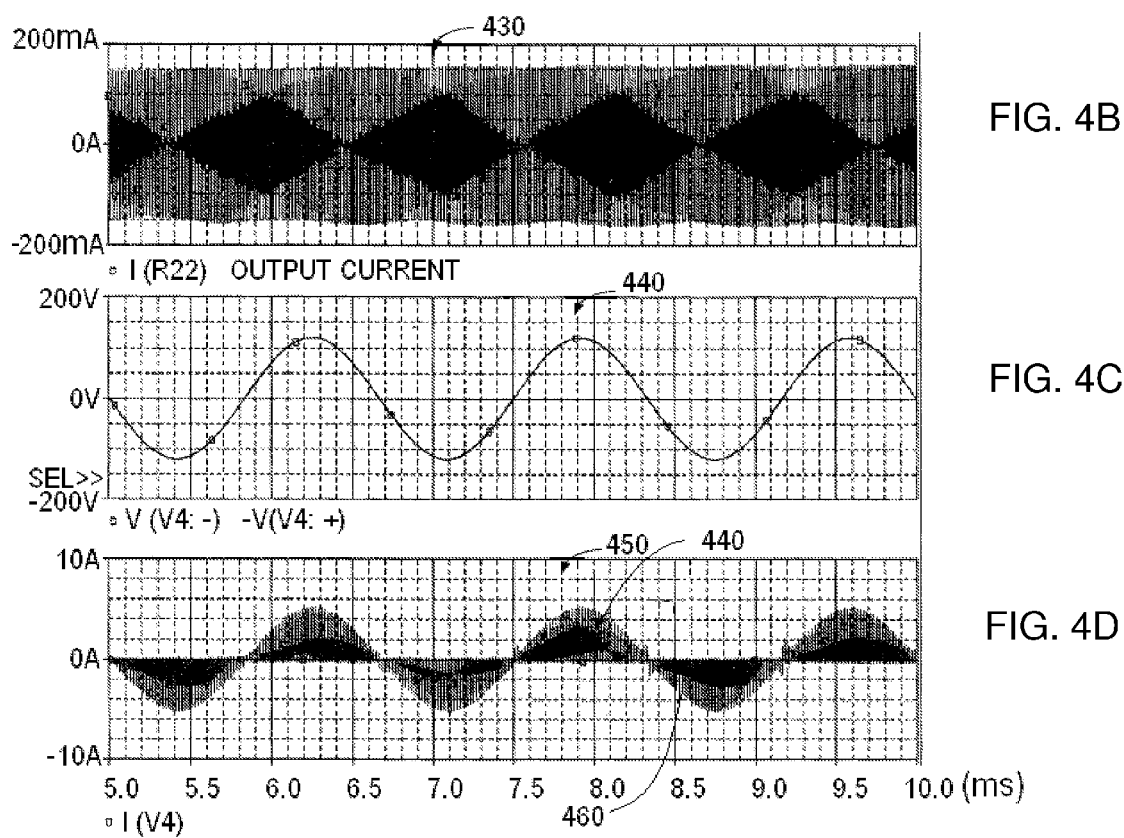

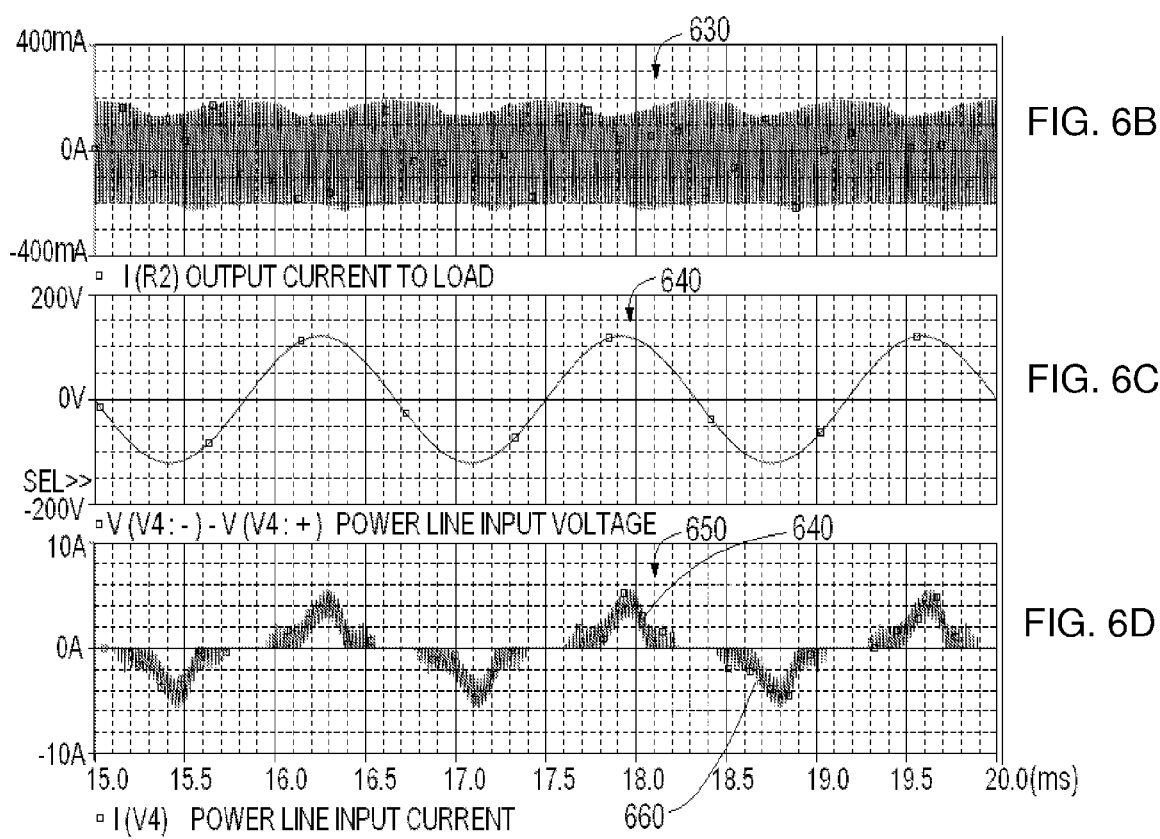

POWER SUPPLY TOPOLOGIES FOR INVERTER OPERATIONS AND POWER FACTOR CORRECTION OPERATIONS

FIELD

The present disclosure relates to power supply topologies for inverter operations and power factor correction operations.

BACKGROUND

In one conventional power supply for an LCD (liquid crystal display) panel, a separate power factor correction (PFC) circuit and inverter circuit are included to provide both input power factor correction and DC/AC inverter operations. In the conventional power supply, the operating frequencies of the PFC circuit are different than those of the inverter circuit. Thus, the conventional power supply may require one stage for power factor correction and a second stage for inverter operations, and each stage may be controlled by a separate controller. Also, the conventional PFC circuit requires at least one additional switch and further requires additional power circuit components. Thus, the conventional power supply may be complicated and expensive to implement.

SUMMARY

One embodiment described herein may provide a controller configured to generate a plurality of control signals to control operations of inverter circuitry to generate an AC signal from a DC signal. The control signals generated by the controller may also be used to control operations of power factor correction (PFC) circuitry, via the inverter circuitry, to enable the PFC circuitry to provide power factor correction of an input source coupled to the PFC circuitry and the inverter circuitry.

A method according to one embodiment may include generating, by a controller, a plurality of control signals to control operations of inverter circuitry to generate an AC signal from a DC signal. The method of this embodiment may also include using the control signals generated by the controller to also control operations of power factor correction (PFC) circuitry, via the inverter circuitry, to enable the PFC circuitry to provide power factor correction of an input source coupled to the PFC circuitry and the inverter circuitry.

At least one system embodiment described herein may provide inverter circuitry capable of generating an AC signal from a DC signal. The system may also include power factor correction (PFC) circuitry coupled to the inverter circuitry and capable of providing power factor correction of an input source coupled to the PFC circuitry and the inverter circuitry. The system may also include a controller configured to generate a plurality of control signals to control operations of the inverter circuitry to generate the AC signal from the DC signal. The control signals generated by the controller may also be used to control operations of the PFC circuitry, via the inverter circuitry, to enable the PFC circuitry to the provide power factor correction.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 4A is a diagram of another exemplary power supply topology of the system of FIG. 1 or 2;

FIGS. 4B-4G depict exemplary signal diagrams generated by the exemplary power supply topology of FIG. 4A;

FIGS. 6B-6H depict exemplary signal diagrams generated by the exemplary power supply topology of FIG. 6A.

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
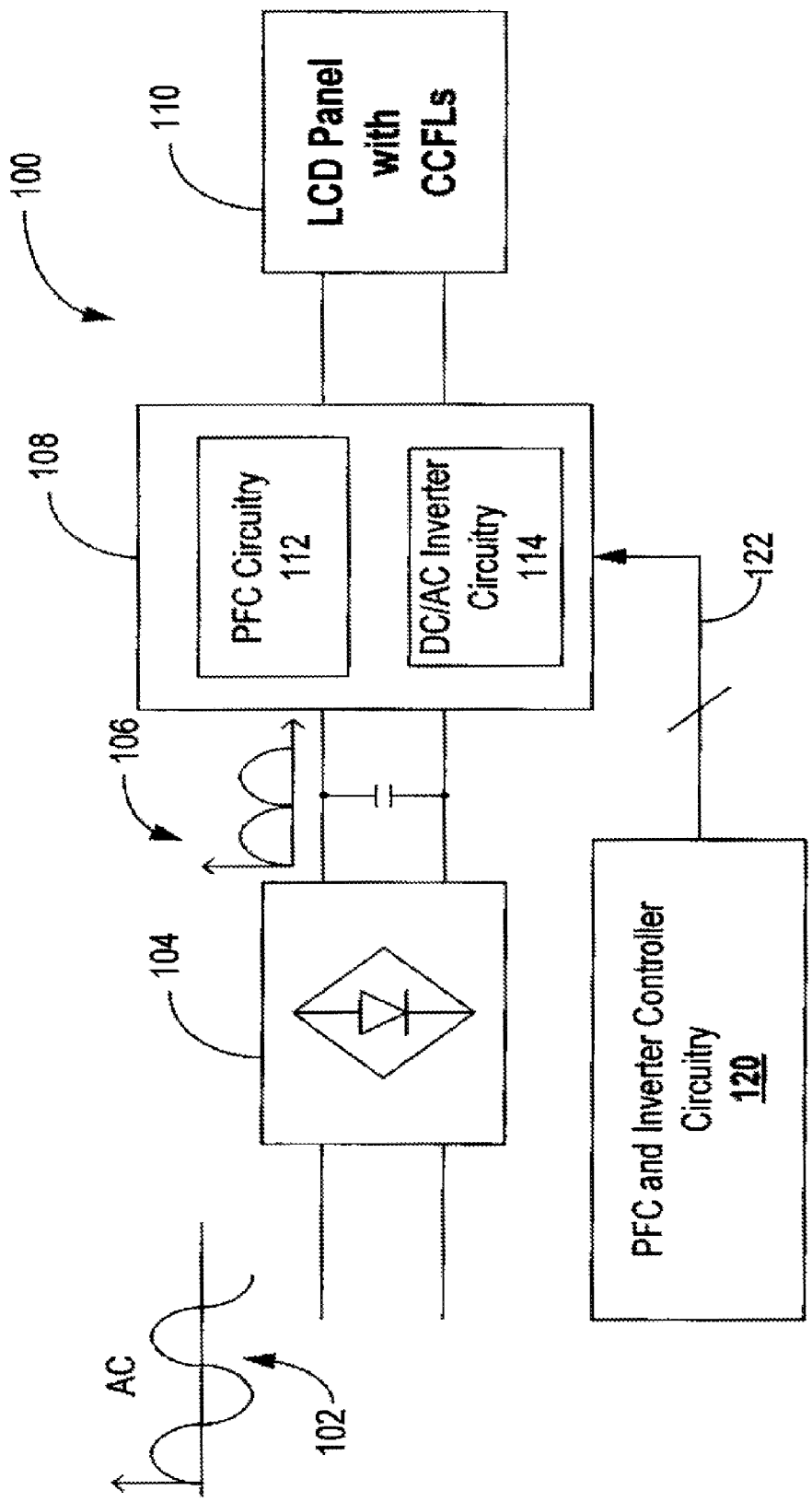
FIG. 1 is a diagram illustrating one exemplary system embodiment.

FIG. 1 illustrates a system embodiment 100 of the claimed subject matter. The system 100 may generally include a liquid crystal display (LCD) panel 110 and circuitry to supply power to the panel 110. The circuitry to supply power to the panel 110 may include power factor correction (PFC) and backlight inverter controller circuitry 120 which may be capable of controlling one or more switches (not shown in this drawing) to supply power to the panel 110 and provide a power-factor-correction operations with respect to a rectified AC signal 106. Panel 110 may comprise one or more cold cathode fluorescent lamps (CCFLs). System 100 may also include rectifier circuitry 104 which may be capable of generating a rectified signal 106 (e.g., full wave rectified signal) from an input AC source 102. The AC source 102 may comprise, for example, standard outlet AC power. Rectified signal 106 may be supplied to circuitry 108.

This embodiment may also include single stage power train circuitry 108. Single stage power train circuitry 108 may include power factor correction (PFC) circuitry 112 and DC/AC inverter circuitry 114. Single stage circuitry 108 may combine both PFC circuitry 112 and inverter circuitry 114 to permit, for example, the ability to use a single controller to control both PFC operations and DC/AC inverter operations. "Power factor correction" as used in any embodiment herein, may include conditioning an input source so that, for example, input current is proportional to input voltage. A specific example of proportional input current and voltage is a condition where the input current waveform follows the input voltage waveform to achieve high power factor. Thus, for example, PFC circuitry 112 may be capable of enabling input current to follow input voltage, as may be generated via input AC source 102.

DC/AC inverter circuitry 114 may be capable of generating an AC signal from a DC signal, to supply power to one or more CCFLs in panel 110. Exemplary DC/AC inverter circuits include, full bridge, half bridge, active clamp, forward, push-pull and/or Class D type inverter topologies, however, existing and/or after-developed inverter topologies are equally contemplated herein and shall be deemed as equivalent structures.

This embodiment may also include PFC and inverter controller circuitry 120. In this embodiment, controller circuitry 120 may be capable of generating a plurality of control signals 122 to control the operations of inverter circuitry 114 to generate an AC signal from a DC signal. Control signals 122 may also control PFC circuitry 112, via inverter circuitry 114, to enable PFC circuitry to provide power factor correction of an input source. Controller circuitry 120 may be capable of providing both PFC operations and inverter operations using the operating frequency appropriate for inverter operations. Thus, the same control signals 122 generated by controller 120 for inverter operations may also be used for power factor correction operations.

Figure 2:
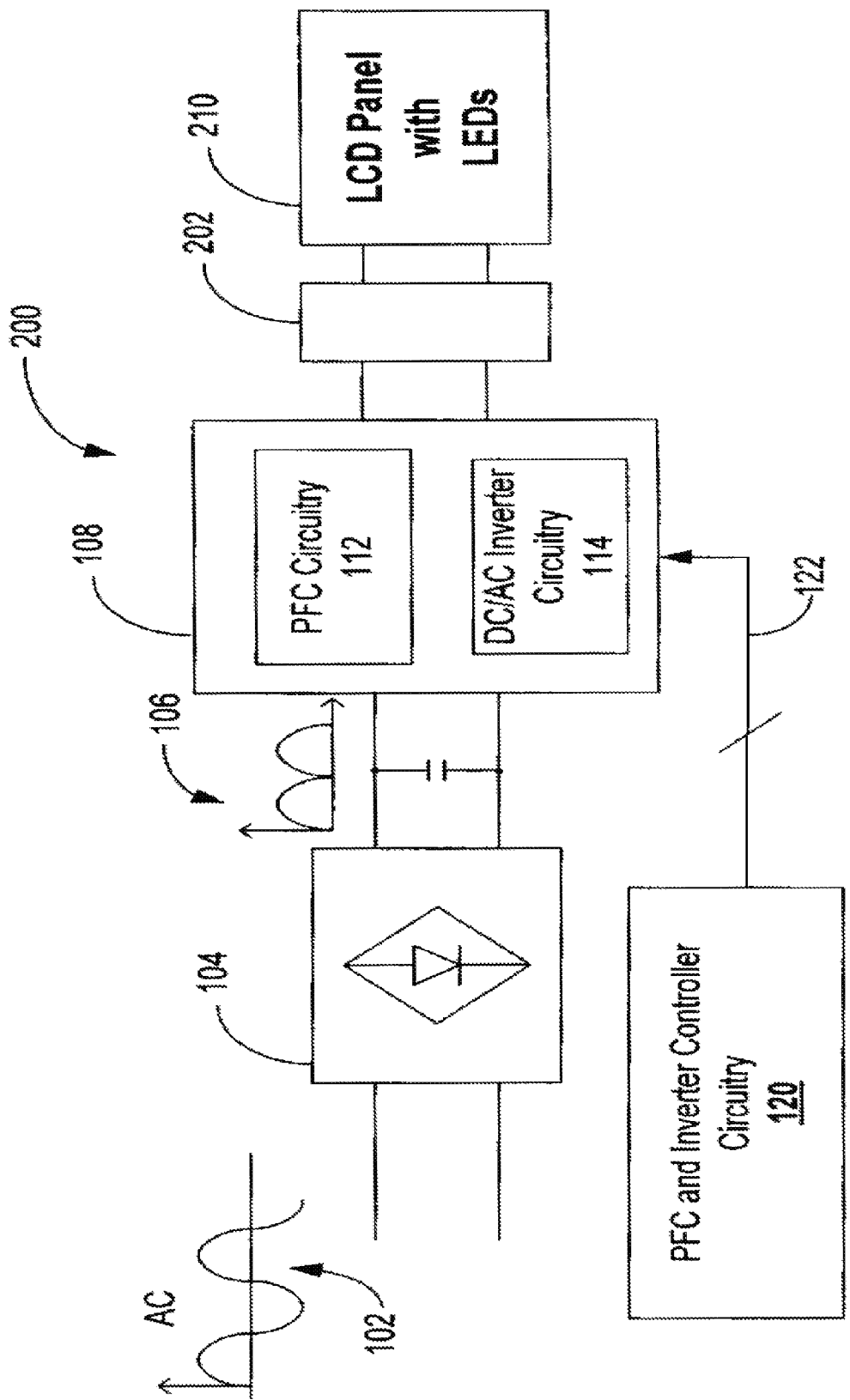
FIG. 2 is a diagram illustrating another exemplary system embodiment.

FIG. 2 illustrates another system embodiment 200 of the claimed subject matter. This embodiment is similar to the embodiment of FIG. 1, except LCD panel 210 may comprise a light emitting diode (LED) array that includes one or more LEDs. Thus, since LEDs may require DC power, this embodiment may alternatively include AC/DC rectifier and filter 202 to convert the AC power provided by circuitry 108 to appropriate DC power for one or more LEDs in panel 210.

Controller circuitry 120 may individually or collectively comprise one or more integrated circuits. As used in any embodiment herein, an "integrated circuit" means a semiconductor device and/or microelectronic device, such as, for example, a semiconductor integrated circuit chip.

PFC and Full Bridge Inverter Operations

Figure 3A:
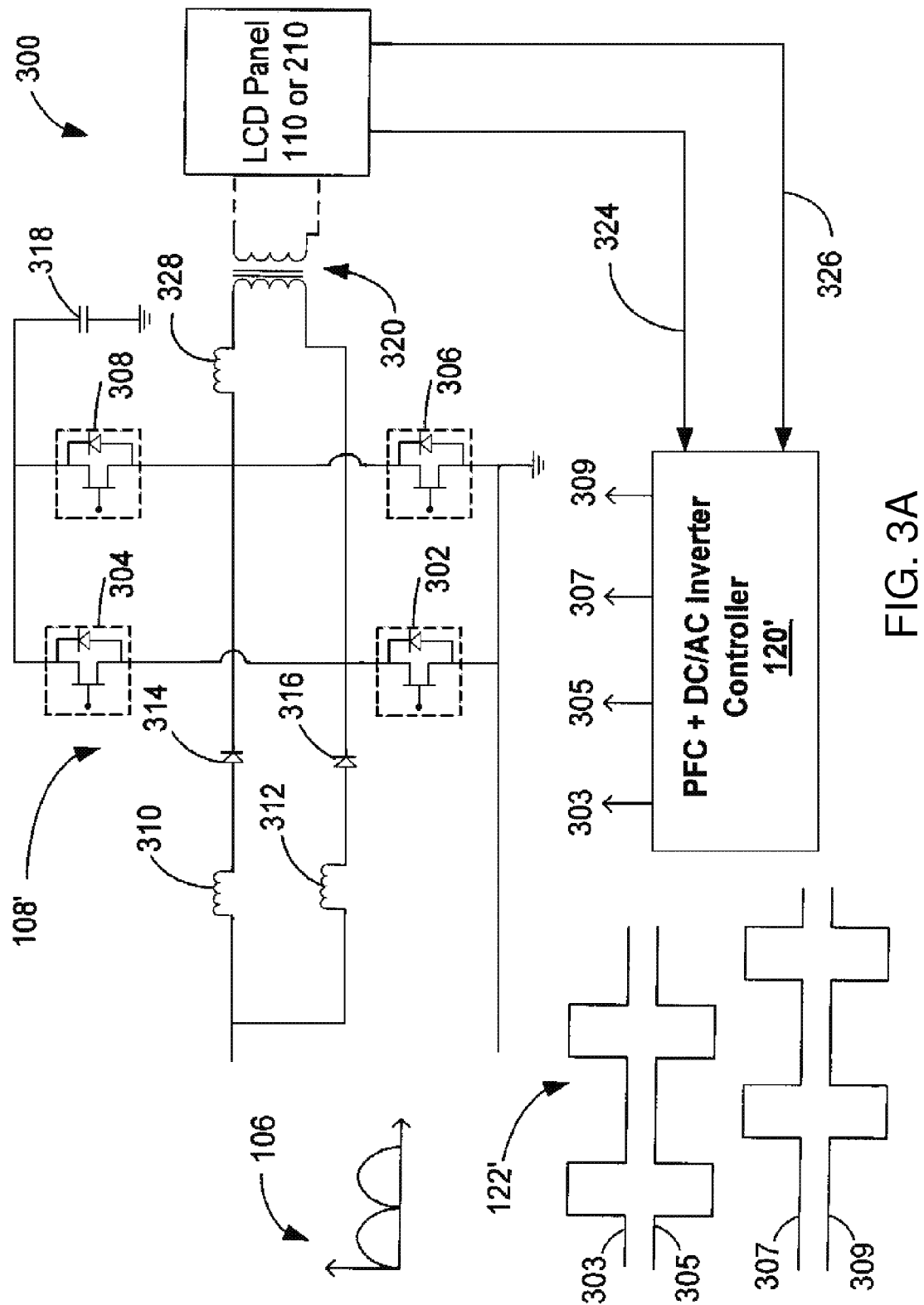
FIG. 3A is a diagram of one exemplary power supply topology of the system of FIG. 1 or 2.

FIG. 3A is a diagram of one exemplary power supply topology 300 of the system of FIG. 1 or 2. In this embodiment, the single stage power train circuitry 108' may include DC/AC inverter circuitry formed of a full bridge inverter circuitry comprising four switches: switches 302, 304, 306 and 308. Switches 302, 304, 306 and 308 may comprise filed effect transistor (FET) switches, bipolar junction transistor (BJT) and/or other switch mechanisms. Each switch 302, 304, 306 and 308 may also include a respective body diode, and each body diode may be connected in parallel with the associated switch. Input power in this embodiment is represented by rectified signal 106, which includes input current $I_{IN}$ and input voltage $V_{IN}$. Rectified signal 106 may be derived from, for example, AC source 102, rectifier circuitry 104 and capacitor, as described above.

Single stage power train circuitry 108' may also include PFC circuitry. In this embodiment, PFC circuitry may include a first energy storage element 310, a second energy storage element 318 and a third energy storage element 312. In this embodiment, the first and third energy storage elements may include inductor circuitry and the second energy storage element may include capacitor circuitry. The first energy storage element 310 may be controllably coupled to the second energy storage element 318 via switches 302 and 308. The third energy storage element 312 may be controllably coupled to the second energy storage element 318 via switches 304 and 306.

As will be described in greater detail below, the first energy storage element 310 may be controlled to provide power factor correction of input current following input voltage and to transfer energy to the second energy storage element 318. Likewise, the third energy storage element 312 may be controlled to provide power factor correction of input current following input voltage and to transfer energy to the second energy storage element 318. In this embodiment, the energy transferred to the second energy storage element 318 may supply a DC signal that is controllably coupled to transformer circuitry 320 and inductor 328, via switches 302, 304, 306 and 308, to supply power to the load 110 or 210.

Power supply topology 300 may also include PFC and DC/AC inverter controller circuitry 120' that may generate a plurality of drive signals 122', for example, signals 303, 305, 307 and 309 to control respective switches 302, 304, 306 and 308. Exemplary drive signals 303, 305, 307 and 309 depicted in the inset of FIG. 3 may include respective rectangular waveform signals (which may comprise, for example, pulse-width modulated signals) for controlling the conduction state (ON/OFF) of respective switches of the full bridge inverter circuit.

As a general overview, in this embodiment, controller 120 may be capable of controlling the conduction state of switches 302, 304, 306 and 308 to provide both DC/AC inverter operations and power factor correction of the input voltage and current, via energy storage elements 310, 318 and 312. Switches 302 and 304 may operate in a complementary fashion, i.e., these switches may be controlled to prevent simultaneous conduction. Likewise, switches 306 and 308 may operate in a complimentary fashion. A first pair of switches 302 and 308 may be controlled to have overlapping conduction (i.e., both switches are conducting for a selected portion of time) and, likewise, a second pair of switches 304 and 306 may be controlled to have overlapping conduction.

The operation of switches 302 and 308 may generate a first half cycle of a rectangular signal, which may be supplied to inductor 328 and step-up transformer 320. The operation of switches 304 and 306 may generate a second other half cycle of the rectangular signal, which may also be supplied to inductor 328 and step-up transformer 320. The rectangular signal may be smoothed to a sinusoidal signal and supplied to one or more lamps in the LCD panel 110 or may be converted to a DC signal and supplied to one or more LEDs in panel 210. For example, when both switches 302 and 308 are turned on, energy stored in capacitor 318 may be delivered, via the current flowing through switch 308, inductor 328, transformer 320, and switch 302 to ground for one half cycle. Transformer 320 may couple the energy to the load 110 or 210. The other half cycle is for the current to flow from capacitor 318 via switch 304, transformer 320, inductor 328 and switch 306 coupled to ground where the transformer couples the energy to the load 110 or 210. This illustrates the DC/AC inverter operations. Note that when switch 304 is turned on, the diode 316 may be in reverse biased. Likewise, when switch 308 is turned on, the diode 314 is reversed biased. When switch 302 is turned on, input voltage 106 is charging inductor 312 via diode 316. When switch 302 is turned off, switch 304 is turned on; and the stored energy in inductor 312 may be delivered to capacitor 318 via switch 304. Similar operation is for 310 to store and deliver energy to capacitor 318 via the turning on of switch 306, turning off switch 306 and turning on switch 308 in sequence. The operations illustrate power factor correction of the input source.

The following is a description of exemplary operations of controller 120'. This example starts with control signal 303 (controlling switch 302) turning ON (high), so that switch 302 conducts. Turning switch 302 ON (conducting) may cause energy from input source 106 to be stored in the third energy storage element 312. The energy stored in energy storage element 312 may be given by:

$I_{312} = (V_{IN} * t_{302})/L$; where L represents the inductance of energy storage element 312 and $t_{302}$ represents the time switch 302 is ON. $V_{IN}$ represents the signal at 106. $I_{312}$ may represent a current signal through inductor 312.

Since, L and $V_{IN}$ may represent known quantities, the current ($I_{IN}$) flowing in energy storage element 312 may be determined by the turn-on time of switch 302. Since the switching frequency for the switches (for example, 10-100 KHz) is much faster than that of the frequency of the input source AC signal (e.g. rectified AC signal of 120 Hz,) therefore, the time switch 302 is ON corresponding each $V_{IN}$ may be maintained constant. Thus, $I_{312}$ is proportional to $V_{IN}$ and power factor correction between input current ($I_{IN}$) and input voltage ($V_{IN}$) may be achieved.

Controller 120' may generate signal 303 to be ON (High) during a selected ON portion of signal 309. Thus, in this example, switch 308 may already be ON (conducting) when switch 302 begins to turn ON. While switch 302 is ON, energy stored in the second energy storage element 318 may be delivered to the "top" of the primary side of transformer 320, through switch 308 and inductor 328.

When switch 302 turns OFF (nonconducting), controller 120' may generate signal 305, which may cause switch 304 to turn ON (as shown by comparing signals 303 and 305). When switch 304 turns ON, energy in the third energy storage element 312 may be transferred to the second energy storage element 318 depicted via switch 304. The above-described operation of controller 120' and switches 302, 308 and 304 may complete the first half cycle of inverter operations to deliver the first half of the rectangular waveform to transformer 320.

Controller 120' may generate signal 307 to be ON (High) during a selected ON portion of signal 305. Thus, in this example, switch 304 may already be ON (conducting) when switch 306 begins to turn ON. Turning switch 306 ON (conducting) may cause energy from input source to be stored in the first energy storage element 310. The energy stored in energy storage element 310 may be given by:

$I_{310}=(V_{IN}*t_{306})/L$; where L represents the inductance of energy storage element 310 and $t_{306}$ represents the time switch 306 is ON.

Therefore, the input current ($I_{IN}$) delivered to energy storage element 310 may be proportional to $V_{IN}$ through the entire low-frequency half cycle of the input source (e.g. 120 Hz rectified AC signal 106) and thus, power factor correction between input current (IN) and input voltage ($V_{IN}$) may be achieved.

While switch 306 is ON, energy stored in the second energy storage element 318 may be delivered to a primary side of transformer 320, through switch 304, through the "bottom" of the primary side of transformer 320, through inductor 328 and through switch 306 to ground. When switch 306 turns OFF (nonconducting), controller 322 may generate signal 309, which may cause switch 308 to turn ON (as shown by comparing signals 307 and 309). When switch 308 turns ON, energy in the first energy storage element 310 may be delivered to the third energy storage element 318 depicted via switch 308. The above-described operation of controller 120' and switches 304, 306 and 308 may complete the second half cycle of inverter operations to deliver the second half of the rectangular waveform to transformer 320. Also, $I_{310}$ is proportional to $V_{IN}$ and power factor correction between input current ($I_{IN}$) and input voltage ($V_{IN}$) may be achieved. The above-described operations may repeat to deliver continuous AC power to transformer 320.

Figures 3B, 3C, 3D:
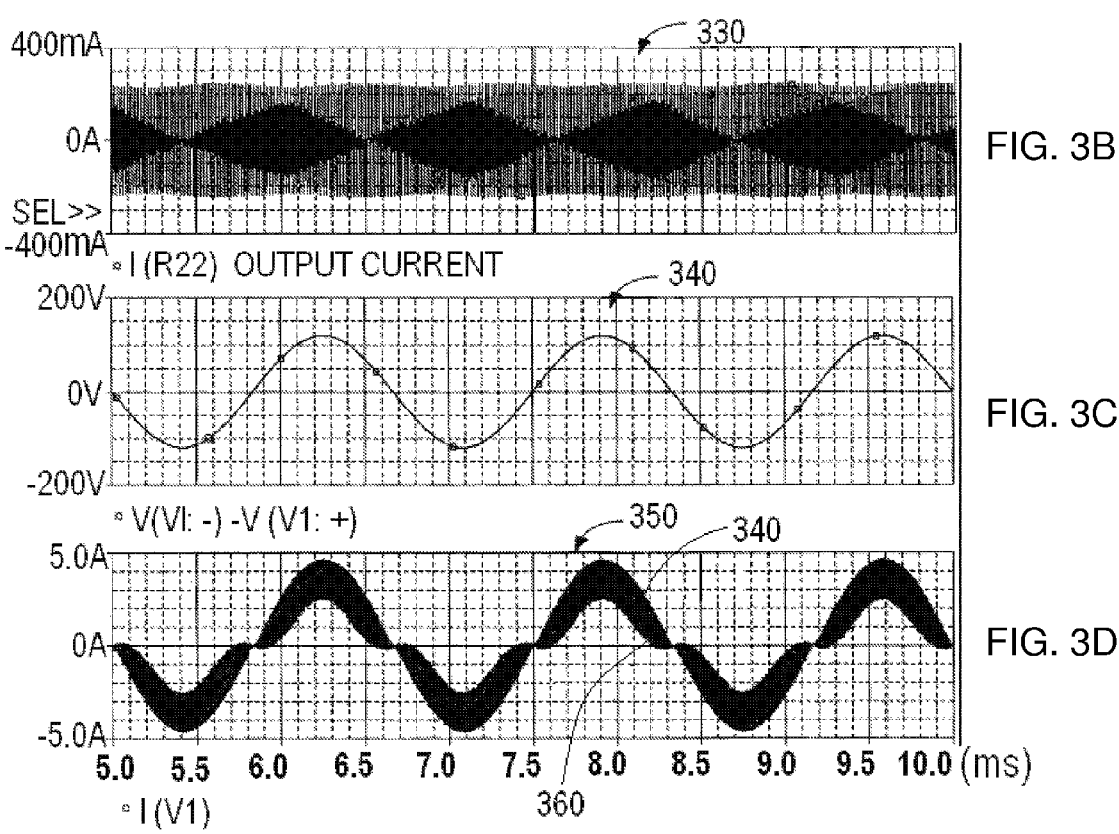
FIGS. 3B-3G depict exemplary signal diagrams generated by the exemplary power supply topology of FIG. 3A.
Figures 3E, 3F, 3G:
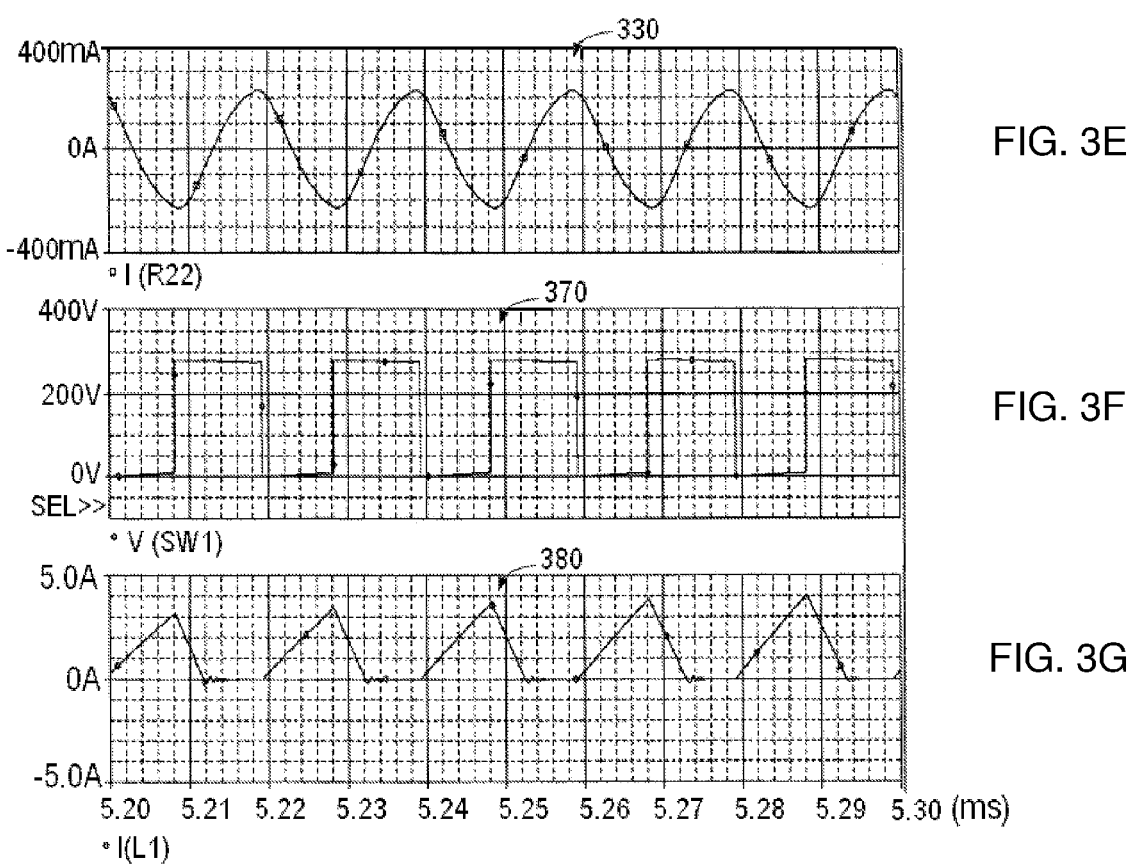

FIGS. 3B-3G depict exemplary signal diagrams generated by the exemplary power supply topology of FIG. 3A. FIG. 3B represents the sinusoidal output current 330 as may be detected on the secondary side of transformer 320. The waveforms depicted in this figure have many sinusoidal high-frequency signals delivered to the load since the same time-scale also illustrates the factor corrected input current and voltage signals (e.g., power factor correction of the low-frequency input source.) Output current 330 may be delivered to the load. FIG. 3E shows in greater detail the output current 330 depicted in FIG. 3B. FIG. 3C represents the sinusoidal input voltage 340 from source 102. In this embodiment, the sinusoidal input voltage 340 may include conventional 120 Volt AC outlet power.

FIG. 3D represents sinusoidal input current 360 as a result of the power factor correction operations, described above. In this embodiment, input current 360 is depicted as an envelope on the input voltage waveform 340. Since the waveform of input current 360 approximately coincides with the envelope of the voltage waveform 340, input voltage 340 and input current 360 may be proportional (for example, within the 60 Hz operation of each half cycle of the input source 106), and thus, power factor correction may be achieved.

FIG. 3F represents the rectangular voltage signal 370 across switch 302. As described above, the rectangular voltage 370 may be at around zero Volt when switch 302 is conducting, and at around the voltage at capacitor 318 when switch 302 is turned off and switch 304 is turned on, which may be in the range of 200-400 Volts. The rectangular voltage across switch 306 may be similar, but phase shifted 180 degrees from signal 370. The result of the difference between the rectangular signals 370 and the voltage across switch 306 may be applied to inductor 328 and transformer 320 for each half cycle of inverter operations (described above) which may step up the voltage and smooth the rectangular signal into a sinusoidal signal. FIG. 3G represents a signal 380 of the current in energy storage element 310. The current in inductor 312 may be similar, but phase shifted 180 degrees from signal 380.

Controller 120' may also be capable of receiving voltage feedback information 324 and/or current feedback information 326, indicative of voltage and/or current supplied to the LCD panel load 110 or 210. Controller 120' may utilize voltage and/or current feedback information to adjust the overlap of signals 302 and 308, and signals 304 and 306, which may adjust the amount of power delivered to the panel 110 or 210. Alternatively, or additionally, controller 120' may also include burst mode circuitry (not shown), which may control power to the panel load by decoupling the inverter circuitry from the load in short, controllable bursts (as is well understood in the art).

PFC and Half Bridge Inverter Operations

FIG. 4A is a diagram of another exemplary power supply topology 400 of the system of FIG. 1 or 2. In this embodiment, the single stage power train circuitry 108" may include DC/AC inverter circuitry formed of half bridge inverter circuitry comprising two switches: switches 402 and 404. Switches 402 and 404 may comprise filed effect transistor (FET) switches, bipolar junction transistor (BJT) and/or other switch mechanisms. Each switch 402 and 404 may also include a respective body diode, and each body diode may be connected in parallel with the associated switch. Input power in this embodiment is represented by rectified signal 106, which includes input current $I_{IN}$ and input voltage $V_{IN}$. Rectified signal 106 may be derived from, for example, AC source 102, rectifier circuitry 104 and capacitor, as described above.

Single stage power train circuitry 108" may also include PFC circuitry. In this embodiment, PFC circuitry may include a first energy storage element 410 and a second energy storage element 418. In this embodiment, the first energy storage element 410 may include inductor and the second energy storage element 418 may include voltage divider capacitor circuitry 418a and 418b.

Power supply topology 400 may also include controller circuitry 120" that may generate a plurality of control signals 122', for example, signals 403 and 405 to control respective switches 402 and 404. Exemplary control signals 403 and 405 depicted in the inset of FIG. 4 may include rectangular waveform signals (which may comprise, for example, pulse-width modulated signals) for controlling the conduction state (ON/OFF) of respective switches of the half bridge inverter circuit.

The first energy storage element 410 may be controllably coupled to the second energy storage element 418, via switches 402 and 404. As will be described in greater detail below, the first energy storage element 410 may be controlled to provide power factor correction of input current and input voltage while transfer energy to the second energy storage element 418.

As a general overview, in this embodiment, controller 120" may be capable of controlling the conduction state of switches 402 and 404 to provide both DC/AC inverter operations and power factor correction of the input voltage and current, via energy storage elements 410 and 418. Switches 402 and 404 may operate with 180 degree apart. Similar to the functions described above, turn-on of switch 402, turn-off of switch 404 may generate a first half cycle of a rectangular signal across the inductor 428 and transformer 420. Turn-on of switch 404 and turn-off of switch 402 may generate a second half cycle of the rectangular signal across the inductor 428 and transformer 420. The rectangular signal may be smoothed to a sinusoidal signal and supplied to one or more lamps in the LCD panel 110 or may be converted to a DC signal and supplied to one or more LEDs in panel 210.

By way of example, and starting with control signal 403 (controlling switch 402) turning ON (high) so that switch 402 conducts. Turning switch 402 ON (conducting) may cause energy from input source 106 to be stored in the first energy storage element 410. The energy stored in energy storage element 410 may be given by:

$I_{410} = (V_{IN} * t_{402})/L$; where L represents the inductance of energy storage element 410 and $t_{402}$ represents the time switch 402 is ON.

As described earlier, Therefore, the input current ($I_{IN}$) delivered to energy storage element 410 may be proportional to $V_{IN}$ through the entire low-frequency half cycle (e.g. 120 Hz rectified AC signal 106) and thus, power factor correction between input current ($I_{IN}$) and input voltage ($V_{IN}$) may be achieved.

While switch 402 is ON, energy stored in the second energy storage element 418b may be delivered to a primary side of transformer 420, on a path through inductor 428 and through the transformer 420 and switch 402 to ground. When switch 402 turns OFF (nonconducting) and before switch 404 turns ON, energy in the first energy storage element 410 may be delivered to the second energy storage elements 418a and 418b, via the body diode of switch 404. The above-described operation of switch 402 may complete the first half cycle of inverter operations to deliver the first half of the rectangular waveform to transformer 420.

When switch 404 is turned ON (using signal 405) and switch 402 is OFF, energy stored in the second energy storage element 418b may be delivered to a primary side of transformer 420, through switch 404, through the "bottom" of the primary side of transformer 420. These operations may consist of closed-loop energy delivery between the storage elements 418a, 418b and transformer 420, which may operate to reset the transformer 420. These operations may complete the second half cycle of inverter operations to deliver the second half of the rectangular waveform to transformer 420. The above operations may repeat to deliver continuous AC power to transformer 420.

Figures 4E, 4F, 4G:
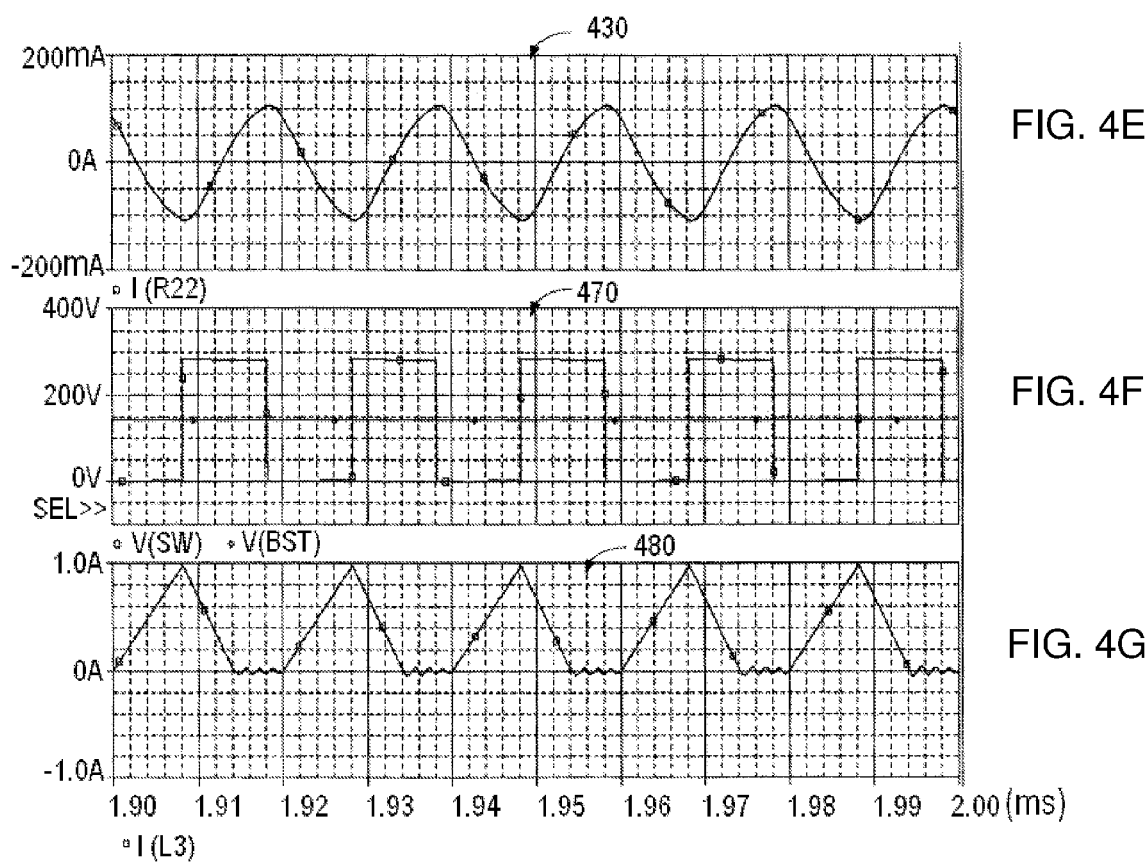

FIGS. 4B-4G depict exemplary signal diagrams generated by the exemplary power supply topology of FIG. 4A. FIG. 4B represents the sinusoidal output current 430 as may be detected on the secondary side of transformer 420. Output current 430 may be delivered to the load. FIG. 4E shows in greater detail the output current 430 depicted in FIG. 4B. FIG. 4C represents the sinusoidal input voltage 440 from source 102. In this embodiment, the sinusoidal input voltage 440 may include conventional 120 Volt AC outlet power.

FIG. 4D represents sinusoidal input current 450 as a result of the power factor correction operations, described above. In this embodiment, input current 450 is depicted as an envelope 460 on the input current. Since the envelope of the input current waveform 460 approximately coincides the voltage waveform 440, input voltage 440 and input current 460 may achieve very high power factor (for example, 90-99% power factor correction of the input source), and thus, power factor correction may be achieved.

FIG. 4F represents the rectangular voltage signal 470 across switch 402. As described above, the rectangular voltage 470 may be generated by energy storage element 418, and may be in the range of 200-400 Volts. The rectangular voltage across switch 404 may be similar, but phase shifted 180 degrees from signal 470. The resulting rectangular signal applied to inductor 428 and transformer 420 due to the switching of switches 404 and 402, which may step up the voltage and smooth the rectangular signal into a sinusoidal signal. FIG. 4G represents a signal 480 of the current in energy storage element 410.

Controller 120" may also be capable of receiving voltage feedback information 424 and/or current feedback information 426, indicative of voltage and/or current supplied to the LCD panel load 110 or 210. Voltage and/or current feedback information may cause controller 120" to adjust the ON times of signals 403 and 405, to adjust the amount of power delivered to the panel 110 or 210. Alternatively, or additionally, controller 120" may also include burst mode circuitry (not shown), which may control power to the panel load by decoupling the inverter circuitry from the load in short, controllable bursts (as is well understood in the art).

PFC and Active Clamp Inverter Operations

Figure 5A:
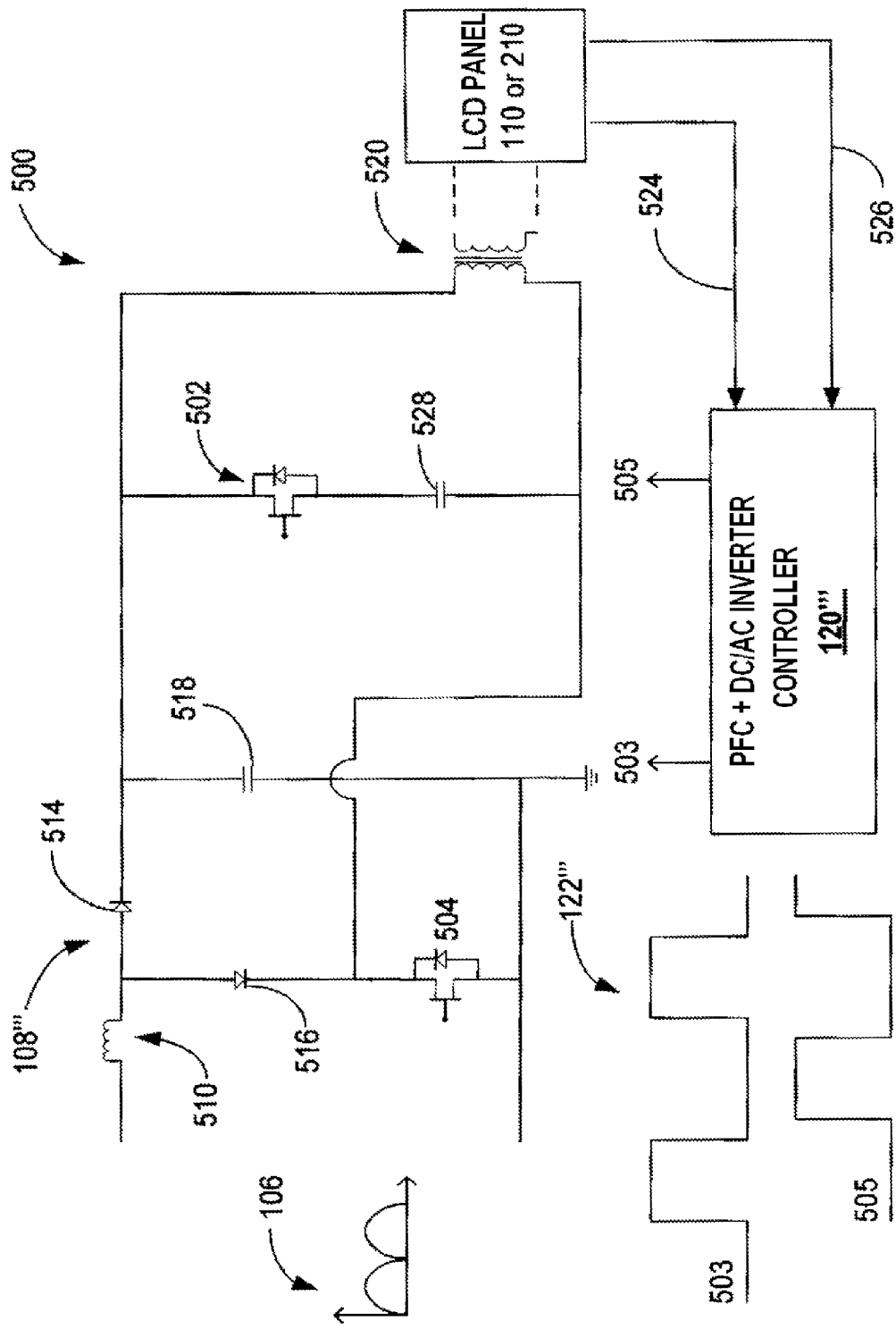
FIG. 5A is a diagram of another exemplary power supply topology of the system of FIG. 1 or 2.

FIG. 5A is a diagram of another exemplary power supply topology 500 of the system of FIG. 1 or 2. In this embodiment, the single stage power train circuitry 108''' may include DC/AC inverter circuitry formed of active clamp inverter circuitry comprising two switches: switches 502 and 504. Switches 502 and 504 may comprise filed effect transistor (FET) switches, bipolar junction transistor (BJT) and/or other switch mechanisms. Each switch 502 and 504 may also include a respective body diode, and each body diode may be connected in parallel with the respective switch. Input power in this embodiment is represented by rectified signal 106, which includes input current $I_{IN}$ and input voltage $V_{IN}$. Rectified signal 106 may be derived from, for example, AC source 102, rectifier circuitry 104 and capacitor, as described above.

Single stage power train circuitry 108''' may also include PFC circuitry. In this embodiment, PFC circuitry may include a first energy storage element 510 and second energy storage element 518. In this embodiment, the first energy storage element 510 may include inductor and the second energy storage element 518 may include capacitor.

Power supply topology 500 may also include controller circuitry 120'''. Controller circuitry 120''' may generate a plurality of control signals 122''', for example, signals 503 and 505 to control the conduction state of respective switches 502 and 504. Exemplary control signals 503 and 505 depicted in the inset of FIG. 5 may include respective rectangular waveform signals (which may comprise, for example, pulse-width modulated signals) for controlling the conduction state (ON/OFF) of respective switches of the active clamp inverter circuit.

The first energy storage element 510 may be controllably coupled to the second energy storage element 518, via switch 504. As will be described in greater detail below, the first energy storage element 510 may be controlled to provide power factor correction of input current and input voltage and to transfer energy to the second energy storage element 518. As with the previous embodiments, the energy transferred to the second energy storage element 518 may supply a DC signal that is controllably coupled to transformer circuitry 520, via switches 502 and 504, to supply power to the load 110 or 210.

As a general overview, in this embodiment, controller 120''' may be capable of controlling the conduction state of switches 502 and 504 to provide both DC/AC inverter operations and power factor correction of the input voltage and current, via energy storage elements 510 and 518. Switches 502 and 504 may operate in a complimentary fashion, i.e., these switches may be controlled to prevent simultaneous conduction. Switches 502 and 504 may be further controlled to provide a break-before-make time between the ON states of each switch. The turn-on of switch 502 may generate a first half cycle of a rectangular signal, which is the voltage across capacitor 518, supplied to step-up transformer 520. The operation of switch 504 may generate a second other half cycle of the rectangular signal, which is the voltage across capacitor 528, supplied to step-up transformer 520. The rectangular signals may be smoothed to a sinusoidal signal and supplied to one or more lamps in the LCD panel 110 or may be converted to a DC signal and supplied to one or more LEDs in panel 210.

By way of example, and starting with control signal 505 (controlling switch 504) turning ON (high) so that switch 504 conducts. Turning switch 504 ON (conducting) may cause energy from input source 106 to be stored in the first energy storage element 510. Note that during this period of the time, the energy in capacitor 518 may be delivered to the transformer 520. The energy stored in energy storage element 510 may be given by:

$I_{510} = (V_{IN} * t_{502})/L$; where L represents the inductance of energy storage element 510 and $t_{502}$ represents the time switch 502 is ON.

Therefore, the input current ($I_{IN}$) delivered to energy storage element 510 may be proportional to $V_{IN}$ within the low-frequency period, and thus, power factor correction between input current ($I_{IN}$) and input voltage ($V_{IN}$) may be achieved.

While switch 504 is ON, energy stored in the second energy storage element 518 may be delivered to a primary side of transformer 520, on a path through switch 504 to ground. The above-described operation of switch 504 may complete the first half cycle of inverter operations to deliver the first half of the rectangular waveform to transformer 520.

When switch 502 is turned on (using signal 503) and switch 504 is OFF, energy stored in the first energy storage element 510 may be delivered to the second energy storage element 518 through diode 514. While switch 502 is ON, the transformer 520 may be reset by the voltage across capacitor 528 and through switch 502 in a closed-loop fashion. These operations may complete the second half cycle of inverter operations to deliver the second half of the rectangular waveform to transformer 520. The above operations may repeat to deliver continuous AC power to transformer 520.

Figures 5B, 5C, 5D:
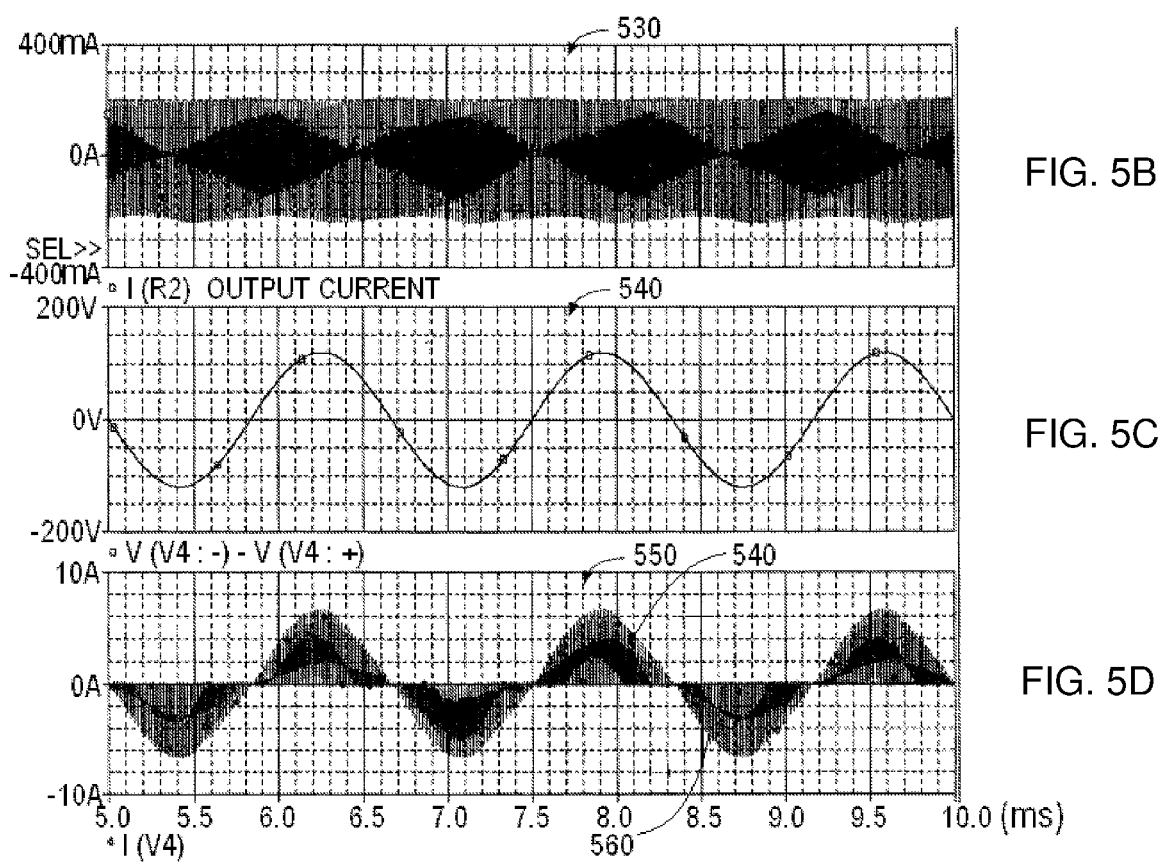
FIGS. 5B-5G depict exemplary signal diagrams generated by the exemplary power supply topology of FIG. 5A.
Figures 5E, 5F, 5G:
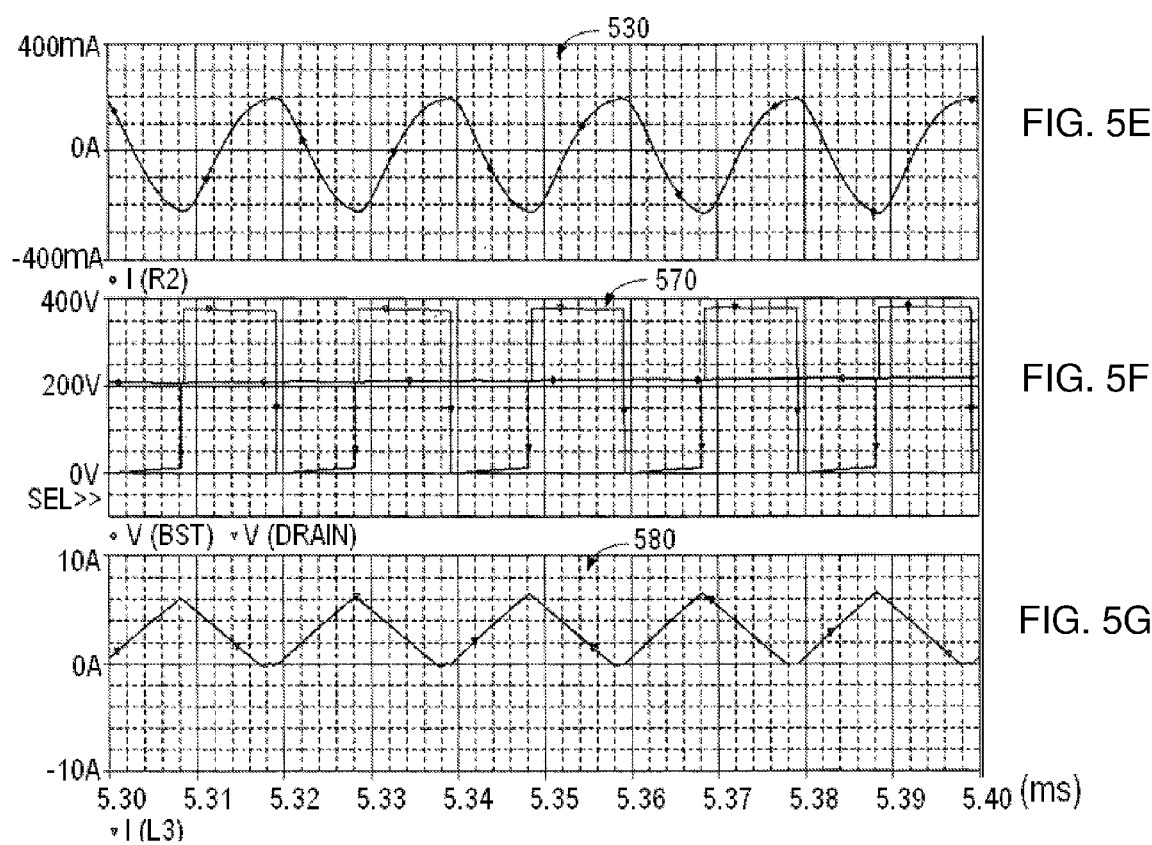

FIGS. 5B-5G depict exemplary signal diagrams generated by the exemplary power supply topology of FIG. 5A. FIG. 5B represents the sinusoidal output current 530 as may be detected on the secondary side of transformer 520. Output current 530 may be delivered to the load. FIG. 5E shows in greater detail the output current 530 depicted in FIG. 5B. FIG. 5C represents the sinusoidal input voltage 540 from source 102. In this embodiment, the sinusoidal input voltage 540 may include conventional 120 Volt AC outlet power.

FIG. 5D represents sinusoidal input current 550 as a result of the power factor correction operations, described above. In this embodiment, input current 550 is depicted as an envelope 560 on the input current. Since the envelope of input current 560 approximately coincides with the voltage waveform 540, input voltage 540 and input current 560 may be proportional, and thus, power factor correction may be achieved.

FIG. 5F represents the rectangular voltage signal 570 across switch 504. As described above, the rectangular voltage 570 may be generated by energy storage element 518, and may be in the range of 200-400 Volts. The rectangular voltage across switch 502 may be similar. The complementarily turn-on and turn-off of switches 504 and 502 may generate a rectangular signal applied to transformer 520 which may step up the voltage and smooth the rectangular signal into a sinusoidal signal. FIG. 5G represents a signal 580 of the current in energy storage element 510.

Controller 120''' may also be capable of receiving voltage feedback information 524 and/or current feedback information 526, indicative of voltage and/or current supplied to the LCD panel load 110 or 210. Voltage and/or current feedback information may cause controller 120''' to adjust the ON times of signals 505 and 503, to adjust the amount of power delivered to the panel 110 or 210. Alternatively, or additionally, controller 120''' may also include burst mode circuitry (not shown), which may control power to the panel load by decoupling the inverter circuitry from the load in short, controllable bursts (as is well understood in the art).

PFC and Forward Inverter Operations

Figure 6A:
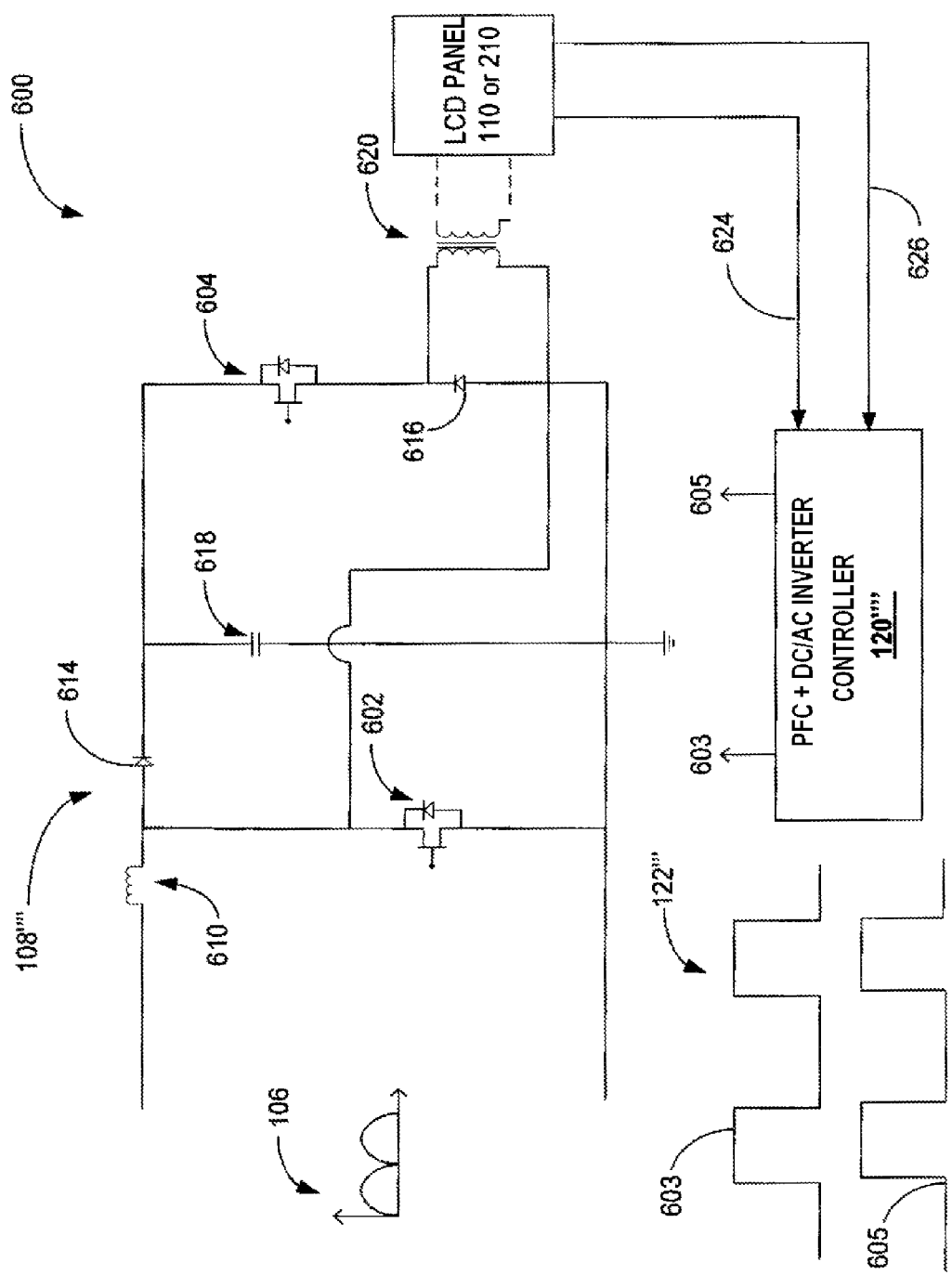
FIG. 6A is a diagram of another exemplary power supply topology of the system of FIG. 1 or 2.

FIG. 6A is a diagram of another exemplary power supply topology 600 of the system of FIG. 1 or 2. In this embodiment, the single stage power train circuitry 108'''' may include DC/AC inverter circuitry formed of forward inverter circuitry comprising two switches: switches 602 and 604. Switches 602 and 604 may comprise filed effect transistor (FET) switches, bipolar junction transistor (BJT) and/or other switch mechanisms. Each switch 602 and 604 may also include a respective body diode, and each body diode is connected is parallel with the associated switch. Input power in this embodiment is represented by rectified signal 106, which includes input current $I_{IN}$ and input voltage $V_{IN}$. Rectified signal 106 may be derived from, for example, AC source 102, rectifier circuitry 104 and capacitor, as described above.

Single stage power train circuitry 108'''' may also include PFC circuitry. In this embodiment, PFC circuitry may include a first energy storage element 610 and second energy storage element 618. In this embodiment, the first energy storage element 610 may include inductor and the second energy storage element 618 may include capacitor.

Power supply topology 600 may also include controller circuitry 120''''. Controller circuitry 120'''' may generate a plurality of control signals 122'''', for example, signals 603 and 605 to control the conduction state of respective switches 602 and 604. Exemplary control signals 603 and 605 depicted in the inset of FIG. 6A may include respective rectangular waveform signals (which may comprise, for example, pulse-width modulated signals) for controlling the conduction state (ON/OFF) of respective switches of the Forward inverter circuit.

The first energy storage element 610 may be controllably coupled to the second energy storage element 618, via switch 602. As will be described in greater detail below, the first energy storage element 610 may be controlled to provide power factor correction of input current and input voltage and to transfer energy to the second energy storage element 618. As with the previous embodiments, the energy transferred to the second energy storage element 618 may supply a DC signal that is controllably coupled to transformer circuitry 620, via switches 602 and 604, to supply power to the load 110 or 210.

As a general overview, in this embodiment, controller 120'''' may be capable of controlling the conduction state of switches 602 and 604 to provide both DC/AC inverter operations and power factor correction of the input voltage and current, via energy storage elements 610 and 618. Switches 502 and 504 may operate in a simultaneous fashion, i.e., these switches may be controlled to enable simultaneous conduction. The ON operation of switches 602 and 604 may generate a first half cycle of a rectangular signal, which may be supplied to step-up transformer 620. The OFF operation of switches 602 and 604 may generate a second other half cycle of the rectangular signal, which may also be supplied to step-up transformer 620. The resulting rectangular signal across the transformer 620 may be smoothed to a sinusoidal signal and supplied to one or more lamps in the LCD panel 110 or may be converted to a DC signal and supplied to one or more LEDs in panel 210.

By way of example, and starting with control signal 603 (controlling switch 602) turning ON (high) and control signal 605 (controlling switch 604) turning ON. Turning switch 602 ON (conducting) may cause energy from input source 106 to be stored in the first energy storage element 610. The energy stored in energy storage element 610 may be given by:

$I_{610}=(V_{IN}*t_{602})/L$; where L represents the inductance of energy storage element 610 and $t_{602}$ represents the time switches 602 and 604 are ON.

Similarly, the input current ($I_{IN}$) delivered to energy storage element 610 may be proportional to $V_{IN}$, and thus, power factor correction between input current ($I_{IN}$) and input voltage ($V_{IN}$) may be achieved.

While switches 602 and 604 are ON, energy stored in the second energy storage element 618 may be delivered to a primary side of transformer 620, on a path through switch 604 and switch 602 to ground. The above-described operation of switches 602 and 604 may complete the first half cycle of inverter operations to deliver the first half of the rectangular waveform to transformer 620.

When switches 602 and 604 are turned OFF (using signals 603 and 605), energy stored in the first energy storage element 610 may be transferred to the second energy storage element 618 through diode 614. While these switches are OFF, the transformer 620 may reset via the flow of the current path of ground to diode 616, to the transformer and diode 614 to clamp the voltage of capacitor 618. These operations may complete the second half cycle of inverter operations to deliver the second half of the rectangular waveform to transformer 620. The above operations may repeat to deliver continuous AC power to transformer 620.

Figures 6E, 6F, 6G, 6H:
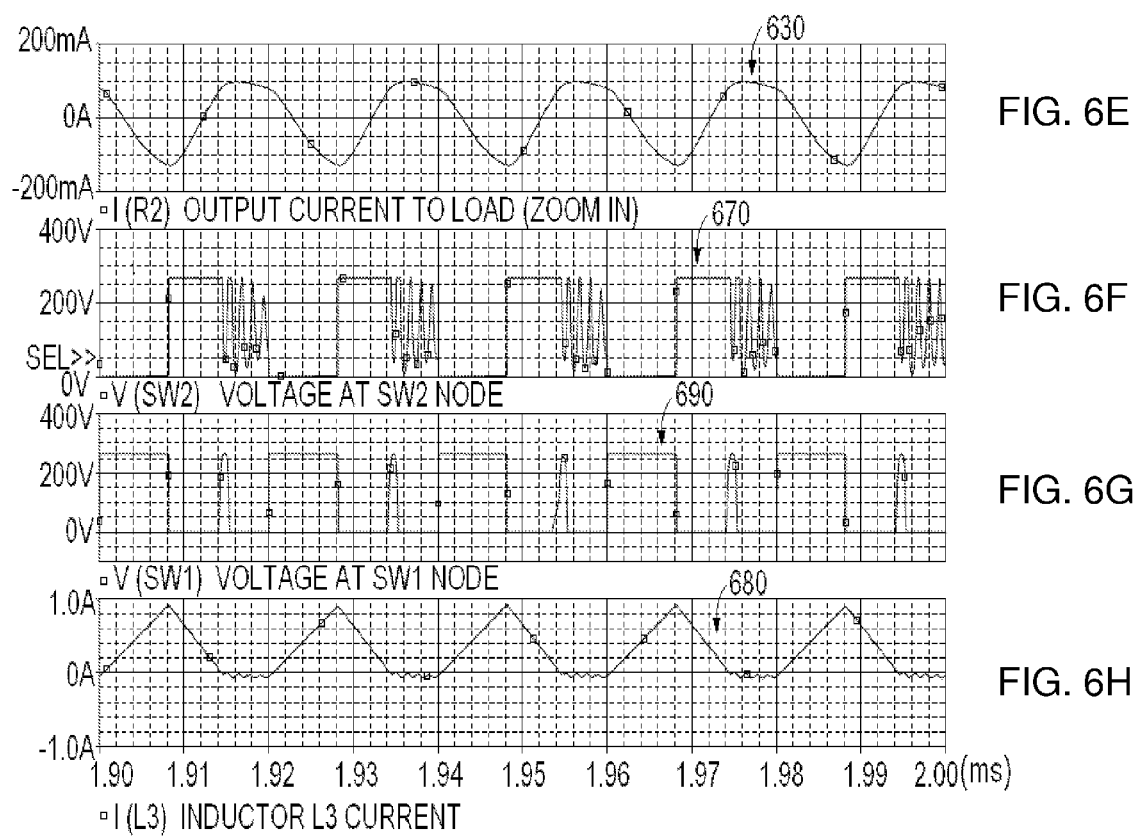

FIGS. 6B-6H depict exemplary signal diagrams generated by the exemplary power supply topology of FIG. 6A. FIG. 6B represents the quasi-sinusoidal output current 630 as may be detected on the secondary side of transformer 620. Output current 630 may be delivered to the load. FIG. 6E shows in greater detail the output current 630 depicted in FIG. 6B. FIG. 6C represents the sinusoidal input voltage 640 from source 102. In this embodiment, the sinusoidal input voltage 640 may include conventional 120 Volt AC outlet power.

FIG. 6D represents sinusoidal input current 650 as a result of the power factor correction operations, described above. In this embodiment, input current 650 is depicted as an envelope 660 on the input current. Since the envelope of input current 660 approximately coincides with the voltage waveform 640, input voltage 640 and input current 660 may be proportional, and thus, improved power factor correction may be achieved.

FIG. 6F represents the rectangular voltage signal 670 across switch 602. As described above, turning ON of switch 602 results in about zero Volts across switch 602; turn-off of switch 602 results in the voltage at capacitor 618 across switch 602. The rectangular voltage 670 may be in the range of 200-400 Volts. FIG. 6G depicts the rectangular voltage 690 across switch 604. The skew of the waveform 690 may be due to the different operations provided by switches 602 and 604. Turn-on of switches 602 and 604 allows the DC/AC inverter operations to deliver energy from capacitor 618 to the load. Switch 602 may also provides additional current path for the storing energy in inductor 610 from input source 106. During turn-off of switches 602 and 604, the waveform across switch 602 may be affected by the leakage inductance of the inductor 610 while waveform across switch 604 may be affected by the leakage inductance of the transformer 620. Therefore, the waveforms may be different. Regardless, the net result of the waveform across transformer 620 may step up the voltage and smooth the rectangular signal into a sinusoidal signal. FIG. 6H represents a signal 680 of the current in energy storage element 610.

Controller 120'''' may also be capable of receiving voltage feedback information 624 and/or current feedback information 626, indicative of voltage and/or current supplied to the LCD panel load 110 or 210. Voltage and/or current feedback information may cause controller 120'''' to adjust the ON times of signals 602 and 604, to adjust the amount of power delivered to the panel 110 or 210. Alternatively, or additionally, controller 120'''' may also include burst mode circuitry (not shown), which may control power to the panel load by decoupling the inverter circuitry from the load in short, controllable bursts (as is well understood in the art).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An integrated circuit (IC) for inverter operations and power factor correction operations, comprising:
   a controller configured to generate a plurality of control signals to control operations of inverter circuitry to generate an AC signal from a DC signal, said control signals generated by said controller also control operations of power factor correction (PFC) circuitry, via said inverter circuitry, to enable said PFC circuitry to provide power factor correction of an input source coupled to said PFC circuitry and said inverter circuitry,
   said inverter circuitry comprising a first node directly coupled to a first terminal of a first switch and a first terminal of a second switch,
   said PFC circuitry comprising a first energy storage element controllably coupled to a second energy storage element via said first switch and said second switch, wherein a second terminal of said first switch is coupled to ground, a second terminal of said second switch is coupled to a first terminal of said second energy storage element and a second terminal of said second energy storage element is coupled to ground, and wherein said first node is configured to be coupled to a first terminal of a primary said of a transformer and said second energy storage element is configured to be coupled to a second terminal of said primary side of said transformer through an inductor, said controller configured to generate a first control signal to turn said first switch ON allowing energy from said input source to be stored in said first energy storage element and energy stored in said second energy storage element to be delivered to said primary side of said transformer on a path from said second energy storage element through said inductor first, then through said primary side of said transformer then through said first switch and then to ground, said controller configured to generate a second control signal to turn said second switch ON, allowing energy from said second energy storage element to be delivered to said primary side of said transformer, said first control signal and said second control signal configured to turn said first switch OFF before said second switch turns ON allowing energy stored in said first energy storage element to be delivered to said second energy storage element.

2. The IC of claim 1, wherein:
said power factor correction of said input source comprises an input voltage of said input source is proportional to an input current of said input source.

3. The IC of claim 1, wherein:
said plurality of control signals generated by said controller each comprise a pulse-width modulated signal.

4. The IC of claim 1, wherein:
said controller is also configured to control said inverter circuitry and said PFC circuitry to supply power to a load, said load comprises a liquid crystal display (LCD) panel.

5. The IC of claim 1, wherein:
said second energy storage element comprises voltage divider capacitor circuitry comprising a first capacitor and a second capacitor coupled together at a second node, said second node configured to be coupled to said second terminal of said primary side of said transformer through said inductor.

6. A system for inverter operations and power factor correction operations, comprising:
inverter circuitry capable of generating an AC signal from a DC signal;
power factor correction (PFC) circuitry coupled to said inverter circuitry and capable of providing power factor correction of an input source couple to said PFC circuitry and said inverter circuitry; and
a controller configured to generate a plurality of control signals to control operations of inverter circuitry to generate an AC signal from a DC signal, said control signals generated by said controller also control operations of said PFC circuitry, via said inverter circuitry, to enable said PFC circuitry generate said power factor correction,
said inverter circuitry comprising a first node directly coupled to a first terminal of a first switch and a first terminal of a second switch,
said PFC circuitry comprising a first energy storage element controllably coupled to a second energy storage element via said first switch and said second switch, wherein a second terminal of said first switch is coupled to ground, a second terminal of said second switch is coupled to a first terminal of said second energy storage element and a second terminal of said second energy storage element is coupled to ground, and wherein said first node is configured to be coupled to a first terminal of a primary said of a transformer and said second energy storage element is configured to be coupled to a second terminal of said primary side of said transformer through an inductor, said controller configured to generate a first control signal to turn said first switch ON allowing energy from said input source to be stored in said first energy storage element and energy stored in said second energy storage element to be delivered to said primary side of said transformer on a path from said second energy storage element through said inductor first, then through said primary side of said transformer then through said first switch and then to ground, said controller configured to generate a second control signal to turn said second switch ON, allowing energy from said second energy storage element to be delivered to said primary side of said transformer, said first control signal and said second control signal configured to turn said first switch OFF before said second switch turns ON allowing energy stored in said first energy storage element to be delivered to said second energy storage element.

7. The system of claim 6, wherein:
said inverter circuitry comprises half bridge inverter circuitry comprising said first switch capable of being controlled to generate a first half cycle of said AC signal from said DC signal, and said second switch capable of being controlled to generate a second half cycle of the AC signal; and
said first energy storage element controllably coupled to said input source by at least said first switch; said first energy storage element is capable of storing a current proportional to voltage of said input source when said first switch is controlled by said controller to generate said first half cycle of said AC signal; said first energy storage element is controllably coupled to said second energy storage element through said first and second switches to transfer energy in said first energy storage element to said second energy storage element.

8. The system of claim 7, wherein:
said second energy storage element is controllably coupled to transformer circuitry in a closed loop when said second switch is controlled by said controller to generate said second half cycle of said AC signal to said transformer circuitry.

9. The system of claim 6, wherein:
said controller is also configured to control said inverter circuitry and said PFC circuitry to supply power to a load, said load comprises a liquid crystal display (LCD) panel.

10. A method for inverter operations and power factor correction operations, comprising:
generating, by a controller, a plurality of control signals to control operations of inverter circuitry to generate an AC signal from a DC signal said inverter circuitry comprising a first node directly coupled to a first terminal of a first switch and a first terminal of a second switch,
using said control signals generated by said controller to also control operations of power factor correction (PFC) circuitry, via said inverter circuitry, to enable said PFC circuitry to provide power factor correction of an input source coupled to said PFC circuitry and said inverter circuitry, said PFC circuitry comprising a first energy storage element controllably coupled to a second energy storage element via said first switch and said second switch, wherein a second terminal of said first switch is coupled to ground, a second terminal of said second switch is coupled to a first terminal of said second energy storage element and a second terminal of said second energy storage element is coupled to ground, and wherein said first node is coupled to a first terminal of a primary said of a transformer and said second energy storage element is coupled to a second terminal of said primary side of said transformer through an inductor, generating, by said controller, a first control signal to turn said first switch ON allowing energy from said input source to be stored in said first energy storage element and energy stored in said second energy storage element to be delivered to said primary side of said transformer on a path from said second energy storage element through said inductor first, then through said primary side of said transformer then through said first switch and then to ground, generating, by said controller, a second control signal to turn said second switch ON, allowing energy from said second energy storage element to be delivered to said primary side of said transformer, said first control signal and said second control signal configured to turn said first switch OFF before said second switch turns ON allowing energy stored in said first energy storage element to be delivered to said second energy storage element.

11. The method of claim 10, wherein:

said power factor correction of said input source comprises storing a current proportional to an input voltage of said input source.

12. The method of claim 10, further comprising:

controlling, by said controller, said inverter circuitry and said PFC circuitry to supply power to a load, said load comprises a liquid crystal display (LCD) panel.

* * * * *